United States Patent
Fischer et al.

(10) Patent No.: US 7,493,356 B2
(45) Date of Patent: Feb. 17, 2009

(54) DEVICE AND METHOD FOR CRYPTOPROCESSOR

(75) Inventors: Wieland Fischer, Munich (DE); Jean-Pierre Seifert, Munich (DE)

(73) Assignee: Infineon Technologies AG, Munich (DE)

( * ) Notice: Subject to any disclaimer, the term of this patent is extended or adjusted under 35 U.S.C. 154(b) by 884 days.

(21) Appl. No.: 10/976,249

(22) Filed: Oct. 28, 2004

(65) Prior Publication Data

US 2005/0149597 A1 Jul. 7, 2005

Related U.S. Application Data

(63) Continuation of application No. PCT/EP03/04284, filed on Apr. 24, 2003.

(30) Foreign Application Priority Data

Apr. 29, 2002 (DE) .............................. 102 19 161

(51) Int. Cl.
*G06F 7/38* (2006.01)
(52) U.S. Cl. ...................................... 708/491
(58) Field of Classification Search .................. 708/491
See application file for complete search history.

(56) References Cited

U.S. PATENT DOCUMENTS

| 5,644,639 | A | 7/1997 | Naciri et al. |
| 7,197,526 | B1 * | 3/2007 | Qu ............................. 708/491 |
| 2005/0283515 | A1 * | 12/2005 | Ovshinsky et al. .......... 708/491 |

FOREIGN PATENT DOCUMENTS

DE 102 19 158 A1 11/2003

OTHER PUBLICATIONS

Fischer, W., et al., "Increasing the Bitlength of a Crypto-Coprocessor," Cryptographic Hardware and Embedded Systems International Workshop 2002, LNCS 2523, Aug. 13, 2003, pp. 71-81, Springer-Verlag Berlin Heidelberg.

Knuth, D., "The Art of Computer Programming, Third Ed.," 2002, pp. 12-13, vol. 2, Addison-Wesley, New York.

Walter, C., "Fast Modular Multiplication Using 2-Power Radix," International J. of Computer Mathematics, 1991, pp. 21-28, vol. 3.

Paillier, P., "Low-Cost Double-Size Modular Exponentiation or How to Stretch Your Cryptoprocessor," Public Key Cryptography: Second International Workshop on Practice and Theory in Public Key Cryptography, PKC'99, Kamakura, Japan, Mar. 1999, vol. 1560, pp. 223-234, Springer-Verlag Berlin Heidelberg.

* cited by examiner

*Primary Examiner*—Tan V Mai
(74) *Attorney, Agent, or Firm*—Slater & Matsil, L.L.P.

(57) ABSTRACT

A device for converting a term comprising a product of a first operand and a second operand into a representation having an integer quotient regarding a modulus and a remainder, the integer quotient being defined by T/N, T being the term and N being the modulus, and the remainder being defined by T mod N, N being the modulus. The device modularly reduces the term using the modulus on the one hand and modularly reduces the term using an auxiliary modulus, which is greater than the modulus, on the other hand to obtain the remainder on the one hand and the auxiliary remainder on the other hand. Both the remainder and the auxiliary remainder are combined to obtain the integer quotient. The inventive device makes it possible to calculate even the integer quotient, that is the result of the divide (DIV) operation, by performing a command for a modular multiplication existing on conventional cryptoprocessors two times.

12 Claims, 3 Drawing Sheets

$T = A \cdot B$  $\qquad$  $T = A \cdot B + C \cdot 2^n$

1. Inputting A,B,N   /A,B,C,n

2. $R := A \cdot B \bmod N$   $/(A \cdot B + C \cdot 2^n) \bmod N$

3. $N := N + 1$

4. $R1 := A \cdot B \bmod N$   $/(A \cdot B + C \cdot 2^n) \bmod N$

5. $Q := R - R1$ 6. if  (Q<0)

7. $Q := Q + N$ 8. outputting R, Q

FIG 2

DEVICE AND METHOD FOR CRYPTOPROCESSOR

CROSS-REFERENCE TO RELATED APPLICATION

This application is a continuation of co-pending International Application No. PCT/EP03/04284, filed Apr. 24, 2003, which designated the United States and was not published in English, and which is based on German Application No. 102 19 161.1-53 filed Apr. 29, 2002, both of which applications are incorporated herein by reference.

BACKGROUND OF THE INVENTION

1. Field of the Invention

The present invention relates to calculating algorithms and, in particular, to calculating algorithms required for cryptographic applications.

2. Description of the Related Art

In particular in public key cryptography but also in other fields of cryptography, key lengths keep increasing. The reason for this is that the security requirements for such cryptographic algorithms keep increasing, too. With the RSA method as an example of an asymmetric cryptography concept, that is a public key method, the security against so-called brute force attacks increases with the key length used. Brute force attacks are attacks on a cryptographic algorithm, in which the key is to be derived by trying out all the possibilities. It is directly understandable that the time theoretically required for a brute force attack in order to try out all the possibilities strongly increases with an increasing key length.

It is to be mentioned in this context that RSA applications with key lengths of 512 bits used to be considered to be sufficient. Due to a technological and mathematical progress of the "opponent", the key lengths for typical RSA applications have been increased to 1024 bits. In the meantime, some people even think that even this key length is not sufficient so that RSA key lengths of 2048 bits are aimed at.

When, on the other hand, existing cryptographic coprocessors, such as, for example, SmartCards, are considered, it can be seen that there is, of course, the desire to run RSA applications with key lengths of, for example, 2048 bits on cryptographic circuits which originally have only been developed for key lengths of, for example, 1024 bits. It is a characteristic of arithmetic coprocessors for existing SmartCard applications that they have been developed for fixed bit lengths which are not suitable for the latest security requirements, that is they are too small. This has the consequence that a 2048 bits RSA algorithm, for example, cannot be handled efficiently on 1024 bits coprocessors. For RSA applications, for example, the Chinese remainder theorem (CRT) is known, in which a modular exponentiation having a large key length is divided into two modular exponentiations having half the key length, according to which the results of the two modular exponentiations having half the length are summarized correspondingly.

It has been found out in recent times that the Chinese remainder theorem is especially susceptible to DFA attacks (DFA=differential fault analysis).

Thus, a problem in many methods is the "doubling" of the so-called modular multiplication, which is a central operation in cryptographic calculations. Thus a modular exponentiation can be divided into many modular multiplications, i.e., in an operation, in which a product of a first operand A and a second operand B is calculated in a remainder class regarding a modulus N. When the operands A and B each have 2 n bits, typical calculating units having a length of 2 n bits are used. These calculating units, due to their high length, are referred to as long number calculating units, which is, for example, in contrast to classic 8, 16, 32 or 64 bits architectures, which are, for example, employed for PC or workstation processors.

It is desired to execute a modular multiplication A*B mod N with numbers A, B and N of the bit length 2 n on an n bit calculating unit. This is very time-consuming since the numbers A, B, N, . . . can only be loaded in fragments, which is why conventional methods, provided they do not fail completely, are extensive from an organizational point of view and error-prone. In technology, there are several methods with which these problems have been solved so far. These methods are known under the key words Montgomery multiplication, normal multiplication, such as with a Karatsuba-Ofman and a later reduction, such as a Barret reduction.

A further concept in which a Montgomery calculation in a "CRT window" is used is illustrated in P. Pailler, "Low-cost double size modular exponentiation or how to stretch your cryptocoprocessor."

All such concepts are extensive regarding the calculating time and the data organization and thus not always efficient.

In the German patent application, filed on the same day, (German Patent Application No. 102 19 158.1-53, filed Apr. 29, 2002) having the title "Vorrichtung und Verfahren zum Berechnen eines Ergebnisses einer modularen Multiplikation" (device and method for calculating a result of a modular multiplication), a concept in which a modular multiplication for operands of 2 n bits is transformed into several so-called MMD operations, for which operands having half the length, that is having n bits, are sufficient, is described. An MMD operation, apart from the remainder resulting from A×B mod N, also provides the result of the integer division, that is of the DIV operation, wherein this result is also referred to as the integer quotient Q.

In general the operation T mod N results in a remainder R when a term T regarding a modulus N is reduced. The operation T div N, however, provides the integer quotient regarding the modulus N so that the term T can be reconstructed from Q×N+R. The MMD operation (MMD=MultModDiv) thus serves to convert any term T into an integer quotient T and a remainder R regarding a modulus N.

In conventional modular arithmetics used for cryptography techniques, the result of the DIV operation, that is the integer quotient, is normally neither required nor calculated. The concept described above is, however, based on utilizing the DIV information, that is the integer quotient. In this way other applications in which not only the result of the MOD operation, that is the remainder, is required, but in which the integer quotient, that is the result of the DIV operation, is required as well can also exist in technology.

SUMMARY OF THE INVENTION

It is the object of the present invention to provide a concept for converting a term, by which the result of the DIV operation is derivable, even when no explicit DIV command is made available by a processor.

In accordance with a first aspect, the present invention provides a modulo arithmetic unit providing no separate DIV command for calculating an integer quotient for converting a term comprising a product of a first operand and a second operand into a representation having an integer quotient regarding a modulus and a remainder, the integer quotient being defined by T/N, T being the term and N being the modulus, and the remainder being defined by T mod N, N being the modulus, having: a unit for modularly reducing the term regarding the modulus to obtain the remainder and for modularly reducing the term regarding an auxiliary modulus, the auxiliary modulus being greater than the modulus, to obtain an auxiliary remainder; and a combiner for combining the remainder and the auxiliary remainder to obtain the integer quotient.

In accordance with a second aspect, the present invention provides a method for converting a term in a modulo arithmetic unit providing no separate DIV command for calculating an integer quotient, the term comprising a product of a first operand and a second operand into a representation having an integer quotient regarding a modulus and a remainder, the integer quotient being defined by T/N, T being the term and N being the modulus, and the remainder being defined by T mod N, N being the modulus, having the following steps: modularly reducing the term regarding the modulus to obtain the remainder and for modularly reducing the term regarding an auxiliary modulus, the auxiliary modulus being greater than the modulus, to obtain an auxiliary remainder; and combining the remainder and the auxiliary remainder to obtain the integer quotient.

In accordance with a third aspect, the present invention provides a computer program having a program code for performing a method for converting a term in a modulo arithmetic unit providing no separate DIV command for calculating an integer quotient, the term comprising a product of a first operand and a second operand into a representation having an integer quotient regarding a modulus and a remainder, the integer quotient being defined by T/N, T being the term and N being the modulus, and the remainder being defined by T mod N, N being the modulus, having the following steps: modularly reducing the term regarding the modulus to obtain the remainder and for modularly reducing the term regarding an auxiliary modulus, the auxiliary modulus being greater than the modulus, to obtain an auxiliary remainder; and combining the remainder and the auxiliary remainder to obtain the integer quotient, when the computer program runs on a computer.

The present invention is based on the recognition that in calculating units in which only modulo arithmetic units are present, that is calculating units that can calculate the remainder but not the integer quotient, the integer quotient can be calculated using two modular reductions.

For applications in which the result of the DIV operation is required even though there is only an MOD arithmetic, the result of the DIV operation, that is the integer quotient, is calculated according to the invention merely using the modulo arithmetic, that is a modular reduction command.

For this, the term is reduced modularly regarding the modulus in order to obtain the remainder. Then the term is again reduced modularly, but this time regarding an auxiliary modulus greater than the modulus to obtain an auxiliary remainder. The integer quotient is obtained by combining the remainder and the auxiliary remainder.

Preferably the auxiliary modulus is greater by "1" than the modulus and means for combining is formed to subtract the auxiliary remainder from the remainder in order to obtain the integer quotient. If the result of the subtraction turns out to be smaller than 0, the auxiliary modulus is added in one preferred embodiment of the present invention to obtain the integer quotient. If, however, the subtraction result is positive, no further re-treatment steps are required. The subtraction result directly corresponds to the integer quotient.

BRIEF DESCRIPTION OF THE DRAWINGS

These and other objects and features of the present invention will become clear from the following description taken in conjunction with the accompanying drawings, in which:

FIG. 2 is a flow chart of a preferred embodiment for converting the term T with and without an initialization.

Figure 1:
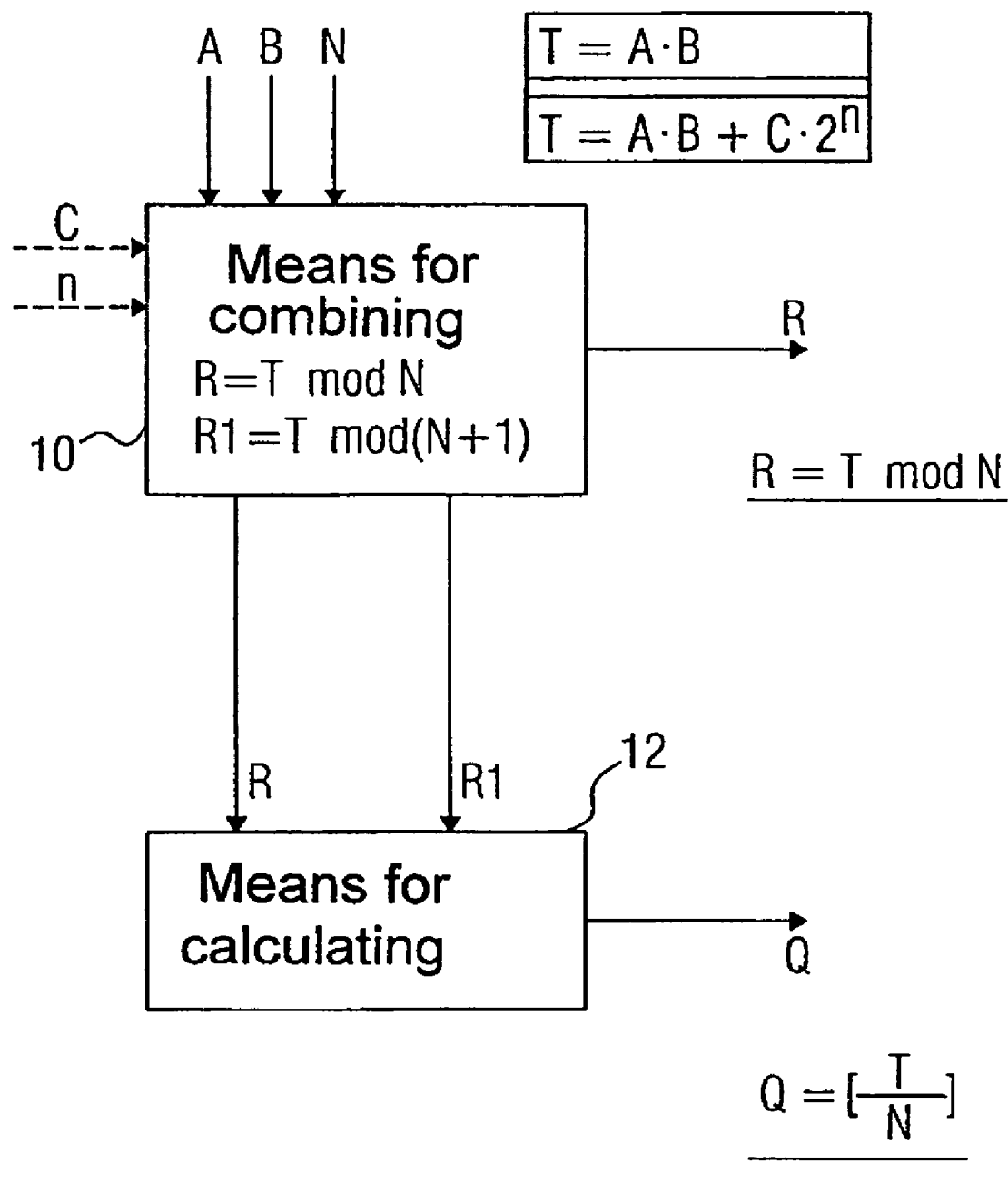
FIG. 1 is a block circuit diagram of an inventive device for converting a term.

The following list of reference numerals can be used in conjunction with the figures:
1 input step
2 first modular reduction
3 modulus incrementation
4 second modular reduction
5 formation of subtraction
6 sign checking
7 addition step
8 output step
10 means for modularly reducing
12 means for combining

DESCRIPTION OF THE PREFERRED EMBODIMENTS

FIG. 1 shows a block circuit diagram of an inventive device for converting a term T comprising a product of a first operand A and a second operand B into a representation comprising an integer quotient Q regarding a modulus and a remainder R, the integer quotient being defined by T/N, T being the term, N being the modulus and the remainder R being defined by T mod N.

The inventive device includes means 10 for modularly reducing the term regarding the modulus N in order to obtain the remainder R. The means for modularly reducing is also formed to reduce the term regarding an auxiliary modulus, the auxiliary modulus being greater than the modulus in order to obtain an auxiliary remainder. The inventive device finally includes means 12 for combining the remainder R and the auxiliary remainder R1 to obtain the integer quotient Q. The result of the DIV operation, that is the integer quotient Q, is thus, according to the invention, calculated using only two modular reductions, that is one regarding the modulus and a second regarding the auxiliary modulus.

A preferred embodiment for an inventive method will be detailed subsequently referring to FIG. 2. A term $T=A\times B$ is taken into consideration, A being a first operand and B being a second operand. In parallel, a second term $T=A\times B+C\times 2^n$ is taken into consideration, A again being a first operand, B being a second operand and C being a third operand and the parameter N being selected to equal the number of bits of the operands A, B, C and N. In particular, N is the number of bits of N, wherein A, B or C may also be shorter. At first, A, B, C and A, C, B, n, respectively, are input (step 1 of FIG. 2). Then a first modular reduction is performed in step 2 to obtain a first remainder R.

In a third step, the modulus N used in the second step is incremented by 1 to obtain an auxiliary modulus equaling N+1. In a fourth step, the term is again reduced modularly, this time using the auxiliary modulus instead of the original modulus.

In a fifth step, a subtraction is performed by subtracting the auxiliary remainder R1 obtained in the fourth step from the remainder R obtained in the second step. If the subtraction result obtained in step 5 is negative, which is checked in step 6, the auxiliary modulus will be added to the subtraction result of step 5. If it is, however, determined in step 6 that the subtraction result Q of step 5 is positive or 0, step 7 can be omitted. In a final step 8, the results, that is the remainder R of the modular multiplication and the integer quotient Q, are output.

A comparison of FIGS. 1 and 2 has the result that steps 2 to 4 can be performed by means 10 and that steps 5 to 7 can be performed by means 12.

A derivation of the algorithm given in FIG. 2 will be illustrated subsequently. The derivation is performed using the term T=A×B. For the purpose of the derivation, it is assumed that the first operand A is larger than or equal to 0 and smaller than N and that the second operand B is also larger than or equal to 0 and smaller than N. In this case, the A*B=Q*N+R applies, wherein the following applies:

$$R:=(A*B) \bmod N, 0<=R<N$$

In addition, it is to be pointed out that it is true for the integer quotient Q that it is smaller than or equal to N−2, since in the largest assumed case (A=B=N−1) the following association is already true:

$$A*B=N*(N-2)+1$$

Thus, the following is true:

$$A*B=Q*N+R$$

In addition, the following applies:

$$A*B=Q*(N+1)+(R-Q),$$

In case R−Q is larger than or equal to 0, the following applies:

$$(R-Q)=(A*B) \bmod (N+1).$$

In case R−Q is smaller than 0, the following applies:

$$(R-Q)+(N+1)=(A*B) \bmod (N+1).$$

In addition the result for Q is either:

$$Q=((A*B) \bmod N)-((A*B) \bmod (N+1))$$

or, if the difference is negative:

$$Q=((A*B) \bmod N)-((A*B) \bmod (N+1))+(N+1).$$

The inventive concept can be retrofit especially easily into a cryptoprocessor or a cryptocoprocessor, since it can be implemented by means of software and can only access a quick command for performing a modular multiplication, which is typically present in such a processor. As can be seen from FIG. 2, apart from simple additions/subtractions, only the two modular multiplications in steps 2 and 4 are required as more complicated commands to calculate the integer quotient.

Figure 3:
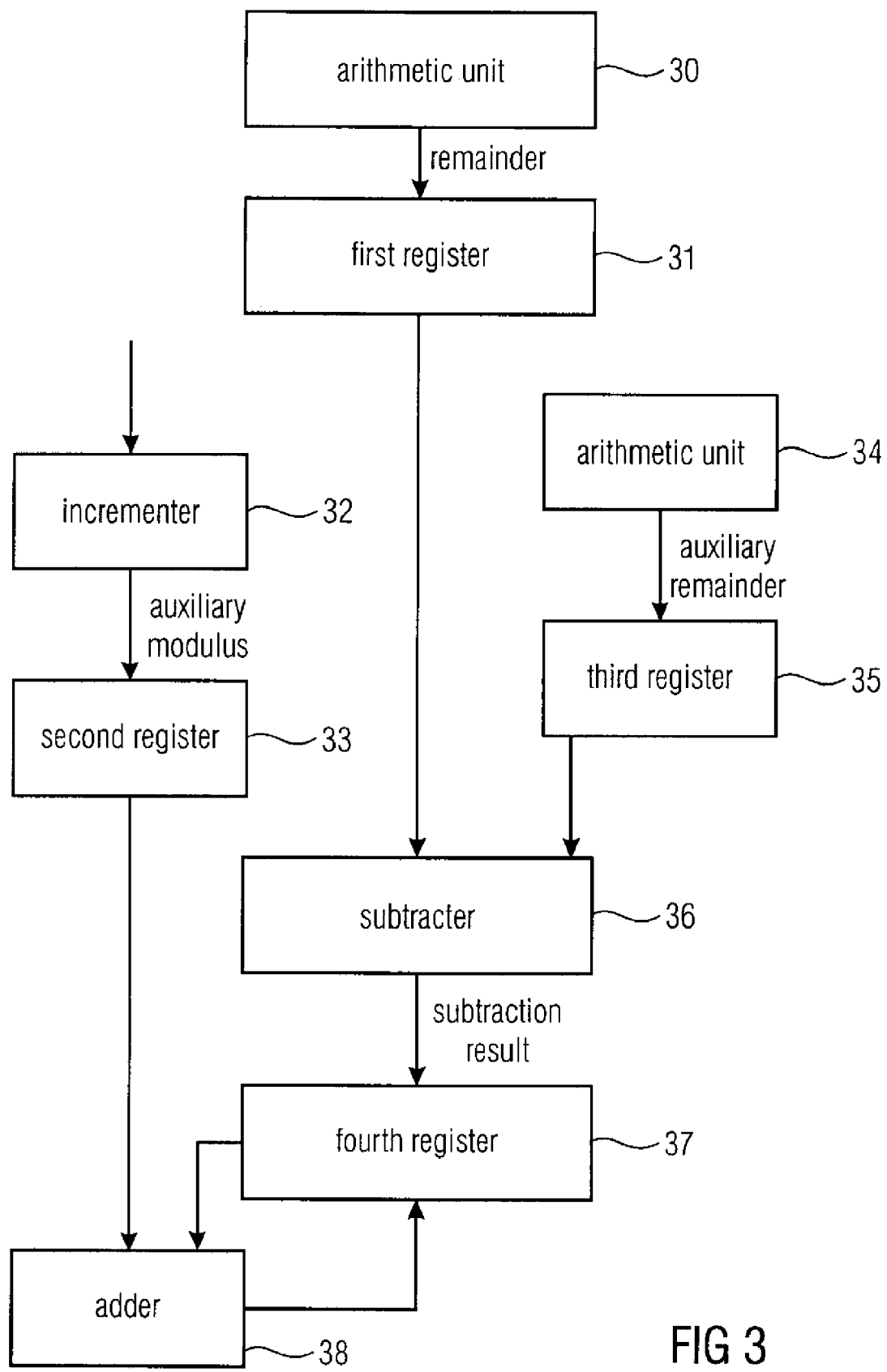
FIG. 3 illustrates an embodiment cryptoptocessor.

FIG. 3 illustrates a cryptoprocessor in accordance with a further embodiment. The unit for modularly reducing comprises an arithmetic unit 30 for calculating the remainder, a first register 31 for storing the remainder, an incrementer 32 for incrementing the modulus by "1" to obtain the auxiliary modulus, a second register 33 for storing the auxiliary modulus, an arithmetic unit 34 for calculating the auxiliary remainder, and a third register 35 for storing the auxiliary remainder. The combiner further comprises a subtracter 36 for subtracting the auxiliary remainder from the remainder to obtain a subtraction result, a fourth register 37 for storing the subtraction result, and an adder 38 for adding a contents of the second register to the contents of the fourth register if the subtraction result is negative and for loading an adding result into the fourth register 37 so that the first register 31 contains the remainder and the fourth register 37 contains the integer quotient.

Preferably, the arithmetic unit 30 for calculating the remainder and the arithmetic unit 31 for calculating the auxiliary remainder are identical, wherein the arithmetic unit is controllable by a controller which at first feeds the modulus and then the auxiliary modulus into the arithmetic unit.

Depending on the circumstances, the inventive concept can thus be implemented in hardware or in software. The implementation can take place on a digital storage medium, in particular a floppy disk or CD having control signals which can be read out electronically, which can cooperate with a programmable computer system or cryptoprocessor, respectively, in such a way that the method is executed. In general, the invention thus also exists in a computer program product having a program code for performing the inventive method stored on a machine-readable carrier, when the computer program product runs on a computer. Put differently, the invention is thus realized as a computer program having a program code for performing the method, when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A cryptoprocessor for performing a cryptographic application, comprising:
    a modulo arithmetic unit for converting a term comprising a product of a first operand and a second operand into a representation having an integer quotient regarding a modulus and a remainder, the integer quotient being defined by T/N, T being the term and N being the modulus, and the remainder being defined by T mod N, N being the modulus, wherein the modulo arithmetic does not provide a separate DIV command for calculating the integer quotient, the modulo arithmetic comprising:
        a unit for modularly reducing the term regarding the modulus to obtain the remainder and for modularly reducing the term regarding an auxiliary modulus, the auxiliary modulus being greater than the modulus, to obtain an auxiliary remainder; and
        a combiner for combining the remainder and the auxiliary remainder to obtain the integer quotient, wherein the first operand, the second operand, the modulus and the integer quotient are quantities in the cryptographic application.

2. The cryptoprocessor according to claim 1, wherein the auxiliary modulus is greater than the modulus by "1".

3. The cryptoprocessor according to claim 1, wherein the combiner is formed to subtract the auxiliary remainder from the remainder to obtain the integer quotient.

4. The cryptoprocessor according to claim 1, wherein the first operand and the second operand are larger than or equal to 0 and smaller than the modulus so that the integer remainder is smaller than or equal to the modulus minus 2, the unit for modularly reducing farther being formed to subtract the modulus or the auxiliary modulus, respectively.

5. The cryptoprocessor according to claim 1, wherein the combiner is formed:

to subtract the auxiliary remainder from the remainder to obtain a subtraction result;

to check whether the subtraction result is negative;

to output the subtraction result as an integer quotient if the subtraction result is not negative; and to add the auxiliary modulus to the subtraction result to obtain the integer quotient if the subtraction result is negative.

6. The cryptoprocessor according to claim 1, wherein the unit for modularly reducing comprises:

an arithmetic unit for calculating the remainder;

a first register for storing the remainder;

an incrementer for incrementing the modulus by "1" to obtain the auxiliary modulus;

a second register for storing the auxiliary modulus;

an arithmetic unit for calculating the auxiliary remainder;

a third register for storing the auxiliary remainder and;

wherein the combiner farther comprises:

a subtracter for subtracting the auxiliary remainder from the remainder to obtain a subtraction result;

a fourth register for storing the subtraction result; and an adder for adding a contents of the second register to the contents of the fourth register if the subtraction result is negative and for loading an adding result into the fourth register so that the first register contains the remainder and the fourth register contains the integer quotient.

7. The cryptoprocessor according to claim 6, wherein the arithmetic unit for calculating the remainder and the arithmetic unit for calculating the auxiliary remainder are identical, wherein the arithmetic unit is controllable by a controller which at first feeds the modulus and then the auxiliary modulus into the arithmetic unit.

8. The cryptoprocessor according to claim 1, wherein the term only comprises the product of the first operand and the second operand.

9. The cryptoprocessor according to claim 1, wherein the term comprises a sum of the product of the first operand and the second operand and a product of a third operand and a factor 2n, n being a bit length of the modulus.

10. A cryptographic method performed in a cryptoprocessor, comprising:

converting a term in a modulo arithmetic unit, the term comprising a product of a first operand and a second operand, into a representation having an integer quotient regarding a modulus and a remainder, the integer quotient being defined by T/N, T being the term and N being the modulus, and the remainder being defined by T mod N, N being the modulus, wherein the modulo arithmetic does not provide a separate DIV command for calculating the integer quotient, the converting comprising:

modularly reducing the term regarding the modulus to obtain the remainder and for modularly reducing the term regarding an auxiliary modulus, the auxiliary modulus being greater than the modulus, to obtain an auxiliary remainder; and combining the remainder and the auxiliary remainder to obtain the integer quotient, wherein the first operand, the second operand, the modulus and the integer quotient are quantities in the cryptographic method.

11. The method according to claim 10, wherein the step of modularly reducing comprises the following sub-steps:

modularly reducing the term using the modulus;

incrementing the modulus to obtain an auxiliary modulus;

modularly reducing the term using the auxiliary modulus; and wherein the step of combining comprises the following steps:

subtracting the auxiliary remainder from the remainder to obtain a subtraction result;

checking a sign of the subtraction result;

if the sign is not negative, outputting the subtraction result as an integer quotient; and if the sign is negative, adding the auxiliary modulus to the subtraction result to obtain the integer quotient.

12. A digital storage medium having stored thereon a computer program having a program code for performing, when being executed on a cryptoprocessor, a cryptographic method comprising:

converting a term in a modulo arithmetic unit, the term comprising a product of a first operand and a second operand, into a representation having an integer quotient regarding a modulus and a remainder, the integer quotient being defined by T/N, T being the term and N being the modulus, and the remainder being defined by T mod N, N being the modulus, wherein the modulo arithmetic does not provide a separate DIV command for calculating the integer quotient, the converting comprising:

modularly reducing the term regarding the modulus to obtain the remainder and for modularly reducing the term regarding an auxiliary modulus, the auxiliary modulus being greater than the modulus, to obtain an auxiliary remainder; and combining the remainder and the auxiliary remainder to obtain the integer quotient, wherein the first operand, the second operand, the modulus and the integer quotient are quantities in the cryptographic method.

* * * * *